(12) United States Patent
Wei et al.

(10) Patent No.: US 8,908,888 B2
(45) Date of Patent: *Dec. 9, 2014

(54) EARPHONE

(71) Applicants: Tsinghua University, Beijing (CN);
Hon Hai Precision Industry Co., Ltd.,
New Taipei (TW)

(72) Inventors: Yang Wei, Beijing (CN); Xiao-Yang Lin, Beijing (CN); Kai-Li Jiang, Beijing (CN); Shou-Shan Fan, Beijing (CN)

(73) Assignees: Tsinghua University, Beijing (CN);
Hon Hai Precision Industry Co., Ltd.,
New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/928,358

(22) Filed: Jun. 26, 2013

(65) Prior Publication Data

US 2014/0140546 A1    May 22, 2014

(30) Foreign Application Priority Data

Nov. 20, 2012    (CN) .......................... 2012 1 04712839

(51) Int. Cl.
*H04R 25/00*    (2006.01)

(52) U.S. Cl.
USPC .......................................... 381/164; 381/380

(58) Field of Classification Search
USPC .................. 381/150, 164, 370, 380
See application file for complete search history.

(56) References Cited

U.S. PATENT DOCUMENTS

| 7,876,912 | B2  | 1/2011  | Liu et al. |
| 8,019,097 | B2* | 9/2011  | Jiang et al. ..................... 381/164 |
| 8,208,661 | B2* | 6/2012  | Jiang et al. ..................... 381/164 |
| 8,300,854 | B2* | 10/2012 | Jiang et al. ..................... 381/164 |
| 8,300,855 | B2  | 10/2012 | Liu et al. |
| 8,553,912 | B2  | 10/2013 | Wang et al. |
| 8,625,822 | B2* | 1/2014  | Jiang et al. ..................... 381/164 |
| 2005/0201575 | A1 | 9/2005 | Koshida et al. |
| 2006/0233388 | A1 | 10/2006 | Liow et al. |
| 2010/0067714 | A1 | 3/2010 | Cheng |
| 2010/0086166 | A1 | 4/2010 | Jiang et al. |
| 2010/0311002 | A1 | 12/2010 | Jiang et al. |
| 2011/0033069 | A1 | 2/2011 | Liu et al. |
| 2011/0051961 | A1 | 3/2011 | Jiang et al. |

(Continued)

FOREIGN PATENT DOCUMENTS

| JP | 11-300274 | 11/1999 |
| JP | 2005-57479 | 3/2005 |

(Continued)

*Primary Examiner* — Suhan Ni
(74) *Attorney, Agent, or Firm* — Novak Druce Connolly Bove + Quigg LLP (57) ABSTRACT

An earphone includes a housing and a thermoacoustic device. The housing has a hollow structure. The thermoacoustic device is disposed in the housing. The thermoacoustic device includes a substrate, a sound wave generator, a first electrode and a second electrode. The first electrode and the second electrode are spaced from each other and electrically connected to the sound wave generator. The substrate includes a first surface and a second surface opposite to the first surface. The first surface defines a number of recesses parallel with and spaced from each other. A depth of each of the recesses ranges from about 100 micrometers to about 200 micrometers. The sound wave generator is located on the first surface of the substrate. The sound wave generator includes a carbon nanotube structure that is suspended over the recesses.

20 Claims, 12 Drawing Sheets

(56) References Cited

U.S. PATENT DOCUMENTS

| | | |
|---|---|---|
| 2011/0054659 A1 | 3/2011 | Carlson et al. |
| 2012/0250907 A1 | 10/2012 | Jiang et al. |
| 2012/0250908 A1 | 10/2012 | Jiang et al. |
| 2013/0129119 A1 | 5/2013 | Miyatake et al. |
| 2013/0216074 A1 | 8/2013 | Kon |

FOREIGN PATENT DOCUMENTS

| | | |
|---|---|---|
| JP | 3808493 | 5/2006 |
| JP | 2008-167252 | 7/2008 |
| JP | 2009-141880 | 6/2009 |
| JP | 2010-74831 | 4/2010 |
| JP | 2010-93804 | 4/2010 |
| JP | 2010-288270 | 12/2010 |
| JP | 2011-41269 | 2/2011 |
| JP | 2012-39272 | 2/2012 |
| JP | 2012-94942 | 5/2012 |
| JP | 2012-209923 | 10/2012 |
| TW | 209093 | 7/1993 |
| TW | M299999 | 10/2006 |
| TW | 200644701 | 12/2006 |
| TW | 200725861 | 7/2007 |
| TW | 200743677 | 12/2007 |
| TW | 201018256 | 5/2010 |
| TW | 201029481 | 8/2010 |
| TW | 201043763 | 12/2010 |
| TW | 201143474 | 12/2011 |
| TW | 201240480 | 10/2012 |

* cited by examiner

EARPHONE

RELATED APPLICATIONS

This application claims all benefits accruing under 35 U.S.C. §119 from China Patent Application No. 201210471283.9, filed on Nov. 20, 2012 in the China Intellectual Property Office, the contents of which are hereby incorporated by reference.

This application is related to commonly-assigned applications entitled, "THERMOACOUSTIC DEVICE", filed Jun. 24, 2013 Ser. No. 13/925,767, the contents of the above commonly-assigned applications are hereby incorporated by reference.

BACKGROUND

1. Technical Field

The present disclosure relates to earphones and, particularly, to a carbon nanotube based earphone.

2. Description of Related Art

Conventional earphone generally includes earphone housing and a sound wave generator disposed in the earphone housing. The earphones can be categorized by shape into ear-cup (or on-ear) type earphones, earphones, ear-hanging earphones, for example. The earphones can be disposed in the ears of a user. The ear-cup type earphones and ear-hanging earphones are disposed outside and attached to the ears of a user. The ear-cup type earphones have circular or ellipsoid ear-pads that completely surround the ears. The ear-hanging type earphones have ear-pads that sit on top of the ears, rather than around them. The earphones can also be categorized as wired earphones and wireless earphones.

The earphone housing generally is a plastic or resin shell structure defining a hollow space therein. The sound wave generator inside the earphone housing is used to transform an electrical signal into sound pressure that can be heard by human ears. There are different types of sound wave generators that can be categorized according by their working principle, such as electro-dynamic sound wave generators, electromagnetic sound wave generators, electrostatic sound wave generators and piezoelectric sound wave generators. However, all the various types ultimately use mechanical vibration to produce sound waves and rely on "electro-mechanical-acoustic" conversion. Among the various types, the electro-dynamic sound wave generators are most widely used. However, the structure of the electric-powered sound wave generator is dependent on magnetic fields and often weighty magnets.

Carbon nanotubes (CNT) are a novel carbonaceous material having extremely small size and extremely large specific surface area. Carbon nanotubes have received a great deal of interest since the early 1990s, and have interesting and potentially useful electrical and mechanical properties, and have been widely used in a plurality of fields. The carbon nanotube film used in the thermoacoustic device has a large specific surface area, and extremely small heat capacity per unit area that make the sound wave generator emit sound audible to humans. However, the carbon nanotube film used in the thermoacoustic device has a small thickness and a large area, and is likely to be damaged by the external forces applied thereon.

What is needed, therefore, is to provide an earphone for solving the problem discussed above.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present epitaxial structures and methods for making the same.

Figure 1:
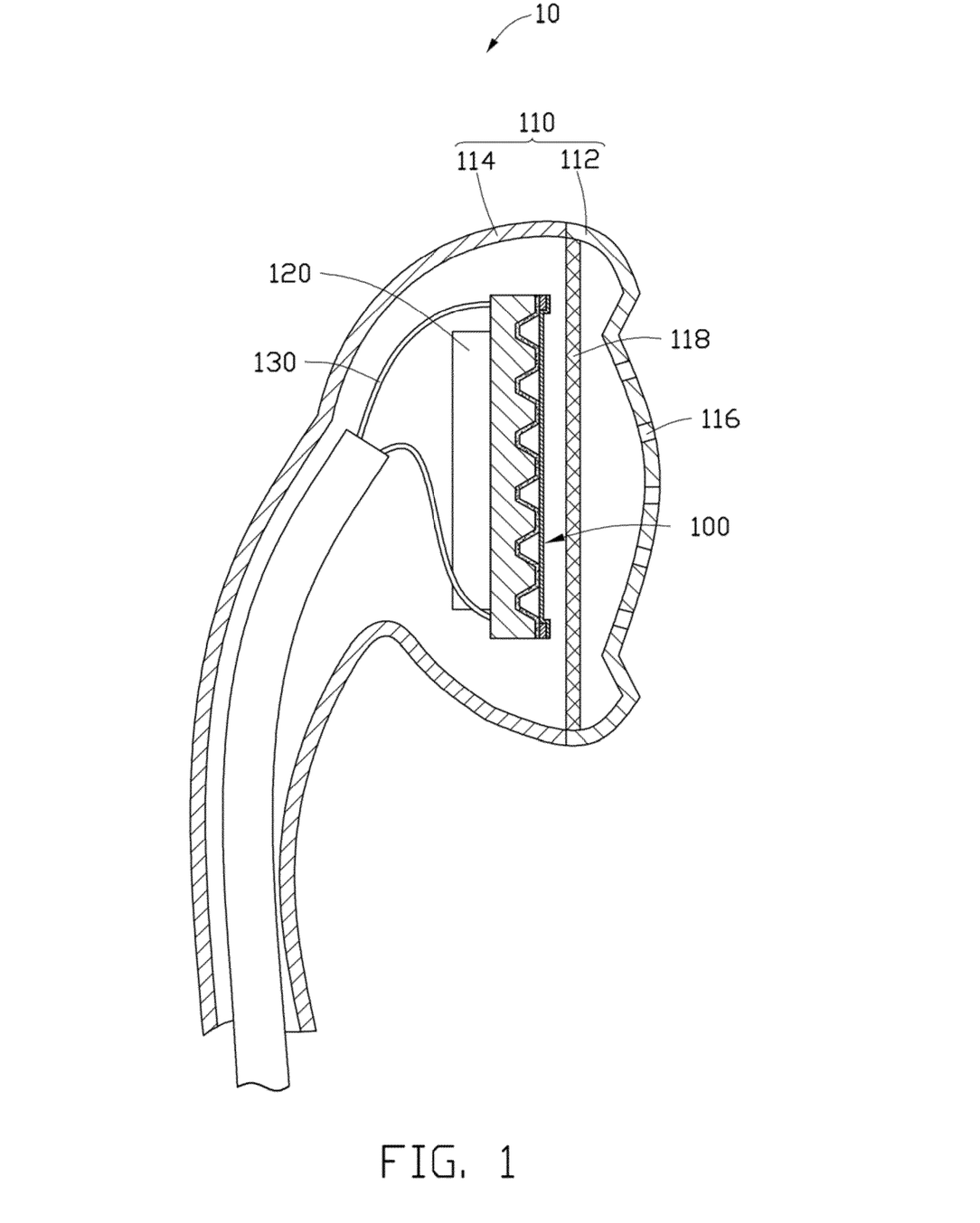
FIG. 1 is a cross-sectional view of one embodiment of an earphone.
Figure 2:
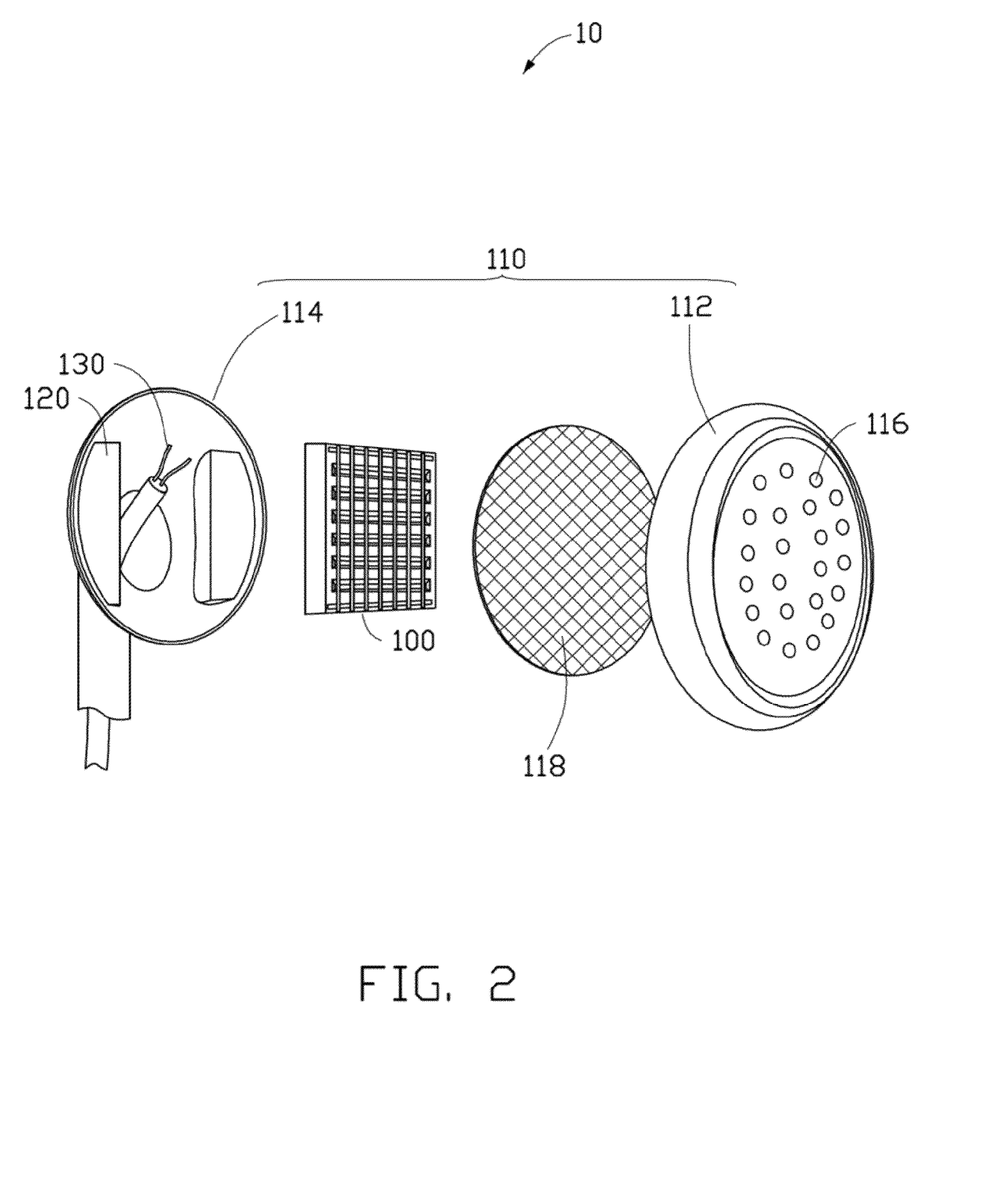
FIG. 2 is a schematic structural view of the earphone of FIG. 1.

FIGS. 1-2 show one embodiment of an earphone 10. The earphone 10 includes a housing 110 and a thermoacoustic device 100 disposed in the housing 110. The housing 110 has a hollow structure. The thermoacoustic device 100 is received in the hollow structure.

The housing 110 includes a front shell 112 and a back shell 114. The front shell 112 and the back shell 114 are combined to form the hollow structure by a snap-fit. A plurality of through openings 116 is defined in the front shell 112, and the thermoacoustic device 100 can be located on the back shell 114. The thermoacoustic device 100 is spaced with and opposite to the plurality of through openings 116. The plurality of openings 116 transfers sound wave out of the housing—110.

The housing 110 can be made of lightweight and strong plastic or resin. The housing 110 covers an ear of user while being used. Furthermore, the earphone 10 includes a protective cover 118 covering the plurality of through openings 116 to protect the thermoacoustic device 100. The protective cover 118 is located between the thermoacoustic device 100 and the plurality of through openings 116 and spaced with the thermoacoustic device 100. A plurality of through holes is defined on the protective cover 118. The material of the protective cover 118 can be plastic or metal.

The earphone 10 further includes a plurality of leading wires 130 electrically connected to the thermoacoustic device 100. The plurality of leading wires 130 is used to input audio electrical signals and driving electrical signals into the thermoacoustic device 100 through the hollow structure.

Figure 3:
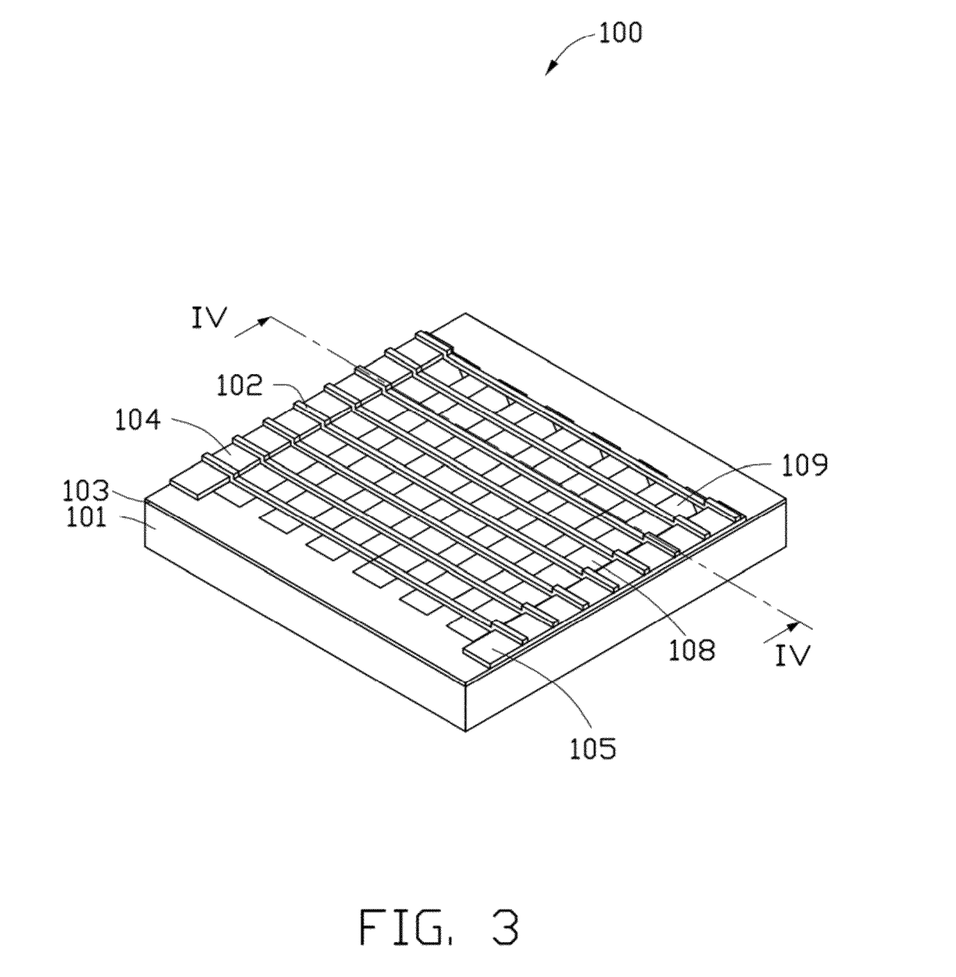
FIG. 3 is a schematic view of a thermoacoustic device of the earphone of FIG. 1.
Figure 4:
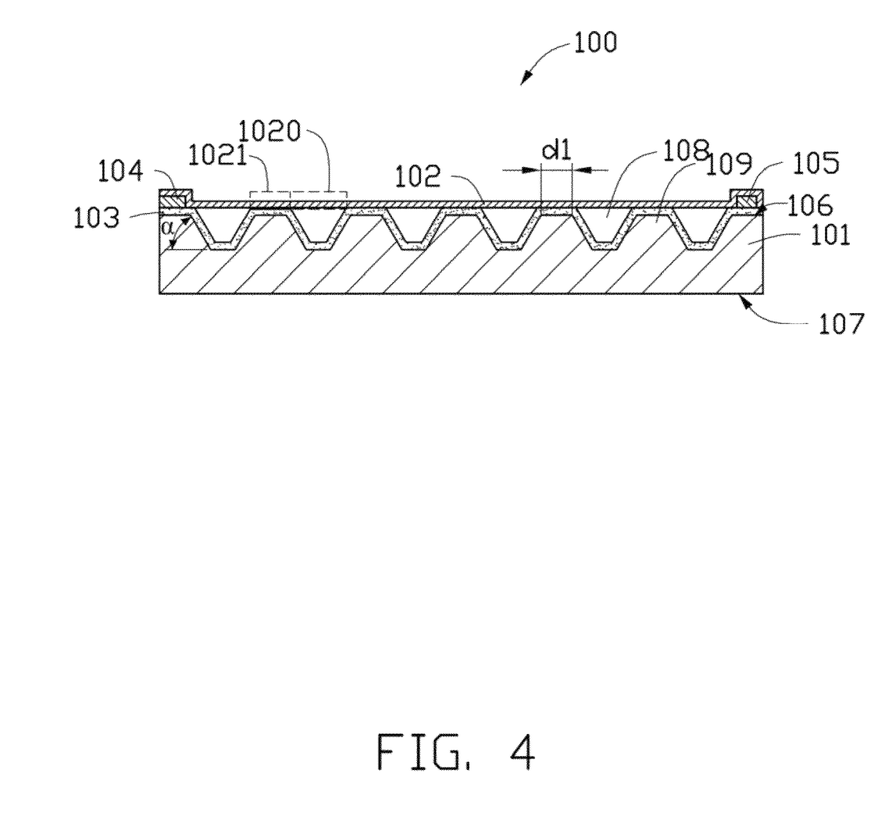
FIG. 4 is a cross-sectional view, along line IV-IV of the thermoacoustic device of FIG. 3.

Referring to FIG. 3, the thermoacoustic device 100 includes a substrate 101, a sound wave generator 102, an insulating layer 103, a first electrode 104, and a second electrode 105. The first electrode 104 and the second electrode 105 are spaced from each other and electrically connected to the sound wave generator 102. The substrate 101 includes a first surface 106 and a second surface 107 opposite to the first surface 106. The first surface 106 defines a plurality of recesses 108, and a bulge 109 is formed between the adjacent two recesses 108. The insulating layer 103 is located on the first surface 106 and continuously attached on the plurality of recesses 108 and the bulge 109. The sound wave generator 102 is located on the insulating layer 103 and insulated from the substrate 101. The sound wave generator 102 defines a first portion 1020 and a second portion 1021. The first portion 1020 is suspended over the plurality of recesses 108. The second portion 1021 is attached on the bulge 109.

The substrate 101 is sheet-shaped. The shape of the substrate 101 can be circular, square, rectangular or other geometric figure. The resistance of the substrate 101 is greater than the resistance of the sound wave generator 102 to avoid a short through the substrate 101. The substrate 101 can have a good thermal insulating property, thereby preventing the substrate 101 from absorbing the heat generated by the sound wave generator 102. The material of the substrate 101 can be single crystal silicon or multicrystalline silicon. The size of the substrate 101 ranges from about 25 square millimeters to about 100 square millimeters. In one embodiment, the substrate 101 is single crystal silicon with a thickness of about 0.6 millimeters, and a length of each side of the substrate 101 is about 8 millimeters.

The plurality of recesses 108 can be uniformly dispersed on the first surface 106 such as dispersed in an array. The plurality of recesses 108 can also be randomly dispersed. In one embodiment, the plurality of recesses 108 extends along the same direction, and spaced from each other with a certain distance. The shape of the recess 108 can be a through hole, a blind recess (i.e., a depth of the recess 108 is less than a thickness of the substrate 101), a blind hole. Each of the plurality of recesses 108 includes a bottom and a sidewall adjacent to the bottom. The first portion 1020 of the sound wave generator 102 is spaced from the bottom and the sidewall.

A depth of the recess 108 can range from about 100 micrometers to about 200 micrometers. The sound waves reflected by the bottom surface of the blind recesses may have a superposition with the original sound waves, which may lead to an interference cancellation. To reduce this impact, the depth of the blind recesses that can be less than about 200 micrometers. In another aspect, when the depth of the blind recesses is less than 100 micrometers, the heat generated by the sound wave generator 102 would be dissipated insufficiently. To reduce this impact, the depth of the blind recesses and holes can be greater than 100 micrometers.

The plurality of recesses 108 can parallel with each other and extend along the same direction. A distance $d_1$ between adjacent two recesses 108 can range from about 20 micrometers to about 200 micrometers. Thus the first electrode 104 and the second electrode 105 can be printed on the substrate 101 via nano-imprinting method. A cross section of the recess 108 along the extending direction can be V-shaped, rectangular, or trapezoid. In one embodiment, a width of the recess 108 can range from about 0.2 millimeters to about 1 micrometer. Thus sound wave generator 102 can be prevented from being broken. Furthermore, a driven voltage of the sound wave generator 102 can be reduced to lower than 12V. In one embodiment, the driven voltage of the sound wave generator 102 is lower than or equal to 5V. In one embodiment, the shape of the recess 108 is trapezoid. An angle α is defined between the sidewall and the bottom. The angle α is equal to the crystal plane angle of the substrate 101. In one embodiment, the width of the recess 108 is about 0.6 millimeters, the depth of the recess 108 is about 150 micrometers, the distance $d_1$ between adjacent two recesses 108 is about 100 micrometers, and the angle α is about 54.7 degrees.

The insulating layer 103 can be a single-layer structure or a multi-layer structure. In one embodiment, the insulating layer 103 can be merely located on the plurality of bulges 109. In another embodiment, the insulating layer 103 is a continuous structure, and attached on the entire first surface 106. The insulating layer 103 covers the plurality of recesses 108 and the plurality of bulges 109. The sound wave generator 102 is insulated from the substrate 101 by the insulating layer 103. In one embodiment, the insulating layer 103 is a single-layer structure and covers the entire first surface 106.

The material of the insulating layer 103 can be $SiO_2$, $Si_3N_4$, or combination of them. The material of the insulating layer 103 can also be other insulating materials. A thickness of the insulating layer 103 can range from about 10 nanometers to about 2 micrometers, such as 50 nanometers, 90 nanometers, and 1 micrometer. In one embodiment, the thickness of the insulating layer is about 1.2 micrometers.

The sound wave generator 102 is located on the first surface 106 and insulated from the substrate 101 by the insulating layer 103. The first portion 1020 of the sound wave generator 102 is suspended over the plurality of recesses 108, and the second portion 1021 of the sound wave generator 102 is attached on the plurality of bulges 109. The second portion 1021 can be attached on the plurality of bulges 109 via an adhesive layer or adhesive particles (not shown).

The sound wave generator 102 has a very small heat capacity per unit area. The heat capacity per unit area of the sound wave generator 102 is less than $2 \times 10^{-4}$ J/cm$^2 \cdot$K. The sound wave generator 102 can be a conductive structure with a small heat capacity per unit area and a small thickness. The sound wave generator 102 can have a large specific surface area for causing the pressure oscillation in the surrounding medium by the temperature waves generated by the sound wave generator 102. The sound wave generator 102 can be a free-standing structure. The term "free-standing" includes, but is not limited to, a structure that does not have to be supported by a substrate and can sustain the weight of it when it is hoisted by a portion thereof without any significant damage to its structural integrity. The suspended part of the sound wave generator 102 will have more sufficient contact with the surrounding medium (e.g., air) to have heat exchange with the surrounding medium from both sides of the sound wave generator 102. The sound wave generator 102 is a thermoacoustic film.

The sound wave generator 102 can be or include a free-standing carbon nanotube structure. The carbon nanotube structure may have a film structure. The thickness of the carbon nanotube structure may range from about 0.5 nanometers to about 1 millimeter. The carbon nanotubes in the carbon nanotube structure are combined by van der Waals attractive force therebetween. The carbon nanotube structure has a large specific surface area (e.g., above 30 m$^2$/g). The larger the specific surface area of the carbon nanotube structure, the smaller the heat capacity per unit area will be. The smaller the heat capacity per unit area, the higher the sound pressure level of the sound produced by the sound wave generator 102.

The carbon nanotube structure can include at least one carbon nanotube film, a plurality of carbon nanotube wires, or a combination of carbon nanotube film and the plurality of carbon nanotube wires.

The carbon nanotube film can be a drawn carbon nanotube film formed by drawing a film from a carbon nanotube array that is capable of having a film drawn therefrom. The heat capacity per unit area of the drawn carbon nanotube film can be less than or equal to about $1.7 \times 10^{-6}$ J/cm$^2 \cdot$K. The drawn carbon nanotube film can have a large specific surface area (e.g., above 100 m$^2$/g). In one embodiment, the drawn carbon nanotube film has a specific surface area in the range of about 200 m$^2$/g to about 2600 m$^2$/g. In one embodiment, the drawn carbon nanotube film is a pure carbon nanotube structure consisting of a plurality of carbon nanotubes, and has a specific weight of about 0.05 g/m$^2$.

The thickness of the drawn carbon nanotube film can be in a range from about 0.5 nanometers to about 100 nanometers. When the thickness of the drawn carbon nanotube film is small enough (e.g., smaller than 10 μm), the drawn carbon nanotube film is substantially transparent.

Figure 5:
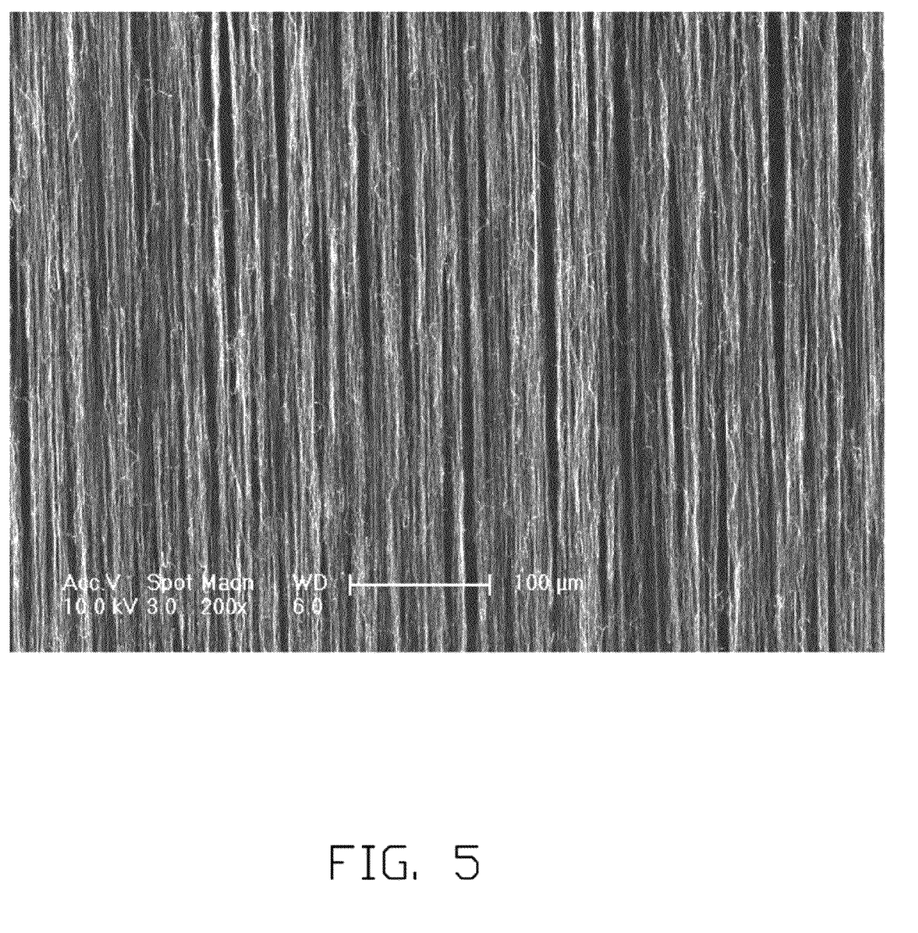
FIG. 5 shows a Scanning Electron Microscope (SEM) image of the drawn carbon nanotube film.

Referring to FIG. 5, the drawn carbon nanotube film includes a plurality of successive and oriented carbon nanotubes joined end-to-end by van der Waals attractive force therebetween. The carbon nanotubes in the drawn carbon nanotube film can be substantially oriented along a single direction and substantially parallel to the surface of the carbon nanotube film. Furthermore, an angle β can exist between the oriented direction of the carbon nanotubes in the drawn carbon nanotube film and the extending direction of the plurality of recesses 108, and 0≤β≤90°. In one embodiment, the oriented direction of the plurality of carbon nanotubes is perpendicular to the extending direction of the plurality of recesses 108. As can be seen in FIG. 5, some variations can occur in the drawn carbon nanotube film. The drawn carbon nanotube film is a free-standing film. The drawn carbon nanotube film can be formed by drawing a film from a carbon nanotube array that is capable of having a carbon nanotube film drawn therefrom. Furthermore, each of the plurality of carbon nanotubes is substantially parallel with the first surface 106.

The carbon nanotube structure can include more than one carbon nanotube films. The carbon nanotube films in the carbon nanotube structure can be coplanar and/or stacked. Coplanar carbon nanotube films can also be stacked one upon other coplanar films. Additionally, an angle can exist between the orientation of carbon nanotubes in adjacent films, stacked and/or coplanar. Adjacent carbon nanotube films can be combined by only the van der Waals attractive force therebetween without the need of an additional adhesive. The number of the layers of the carbon nanotube films is not limited. However, as the stacked number of the carbon nanotube films increases, the specific surface area of the carbon nanotube structure will decrease. A large enough specific surface area (e.g., above 30 m$^2$/g) must be maintained to achieve an acceptable acoustic volume. An angle θ between the aligned directions of the carbon nanotubes in the two adjacent drawn carbon nanotube films can range from about 0 degrees to about 90 degrees. Spaces are defined between two adjacent carbon nanotubes in the drawn carbon nanotube film. When the angle θ between the aligned directions of the carbon nanotubes in adjacent drawn carbon nanotube films is larger than 0 degrees, a microporous structure is defined by the carbon nanotubes in the sound wave generator 102. The carbon nanotube structure in an embodiment employing these films will have a plurality of micropores. Stacking the carbon nanotube films will add to the structural integrity of the carbon nanotube structure.

Each of the plurality of carbon nanotube wires is parallel with and spaced from each other. The plurality of carbon nanotube wires is intersected with the plurality of recesses 108. In one embodiment, the plurality of carbon nanotube wires is perpendicular to the plurality of recesses 108. Each of the plurality of carbon nanotube wires includes a plurality of carbon nanotubes, and the extending direction of the plurality of carbon nanotubes is parallel with the carbon nanotube wire. The plurality of carbon nanotube wires is suspended over the plurality of recesses 108.

A distance between adjacent two carbon nanotube wires ranges from about 1 micrometers to about 200 micrometers, such as 50 micrometers, 150 micrometers. In one embodiment, the distance between adjacent tow carbon nanotube wires is about 120 micrometers. A diameter of the carbon nanotube wire ranges from about 0.5 nanometers to about 100 micrometers. In one embodiment, the distance between adjacent two carbon nanotube wires is about 120 micrometers, and the diameter of the carbon nanotube wire is about 1 micrometer.

Figure 6:
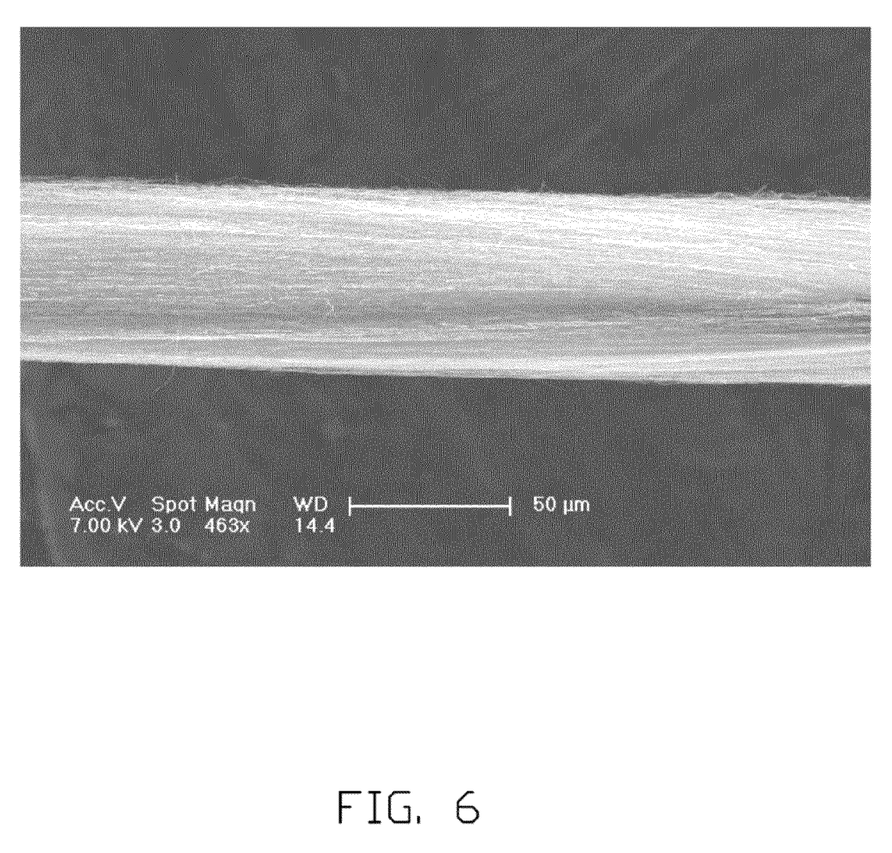
FIG. 6 shows an SEM image of an untwisted carbon nanotube wire.

The carbon nanotube wire can be untwisted or twisted. Treating the drawn carbon nanotube film with a volatile organic solvent can form the untwisted carbon nanotube wire. Specifically, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus, the drawn carbon nanotube film will be shrunk into untwisted carbon nanotube wire. Referring to FIG. 6, the untwisted carbon nanotube wire includes a plurality of carbon nanotubes substantially oriented along a same direction (i.e., a direction along the length of the untwisted carbon nanotube wire). The carbon nanotubes are parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 0.5 nm to about 100 μm.

Figure 7:
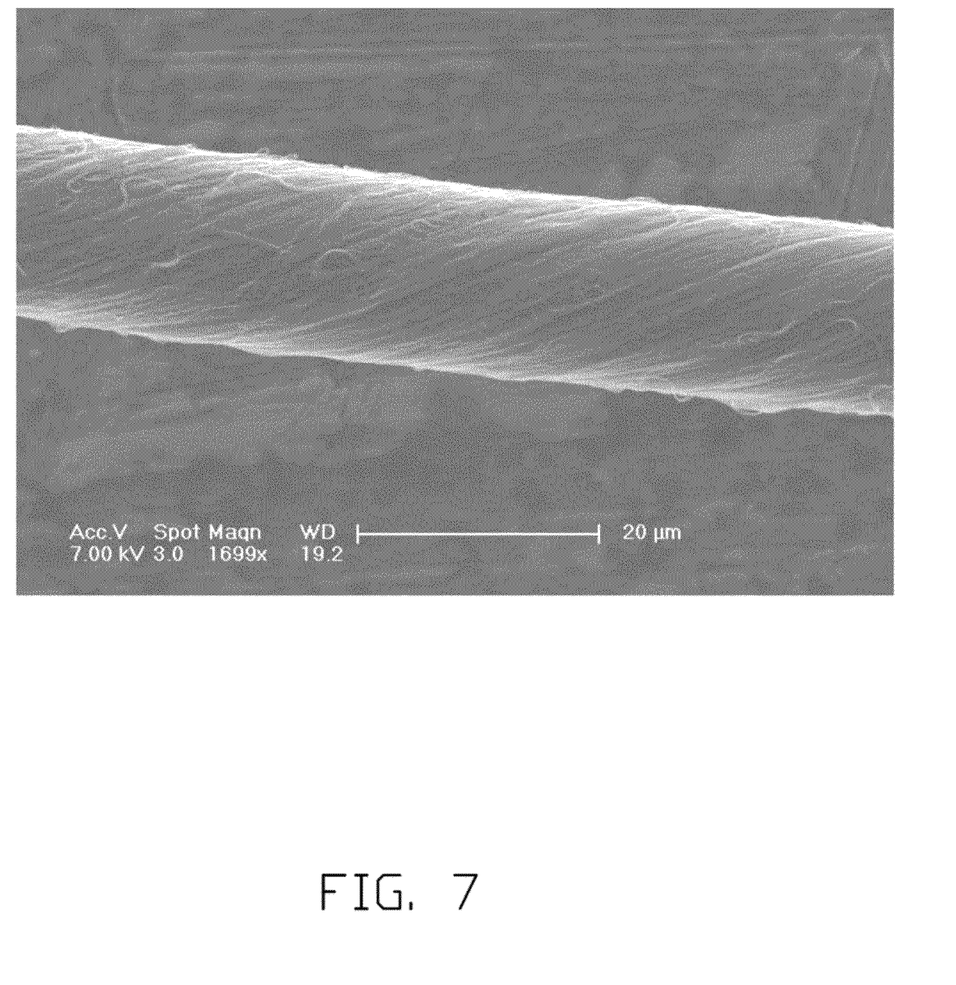
FIG. 7 shows an SEM image of a twisted carbon nanotube wire.

The twisted carbon nanotube wire can be formed by twisting a drawn carbon nanotube film using a mechanical force to turn the two ends of the drawn carbon nanotube film in opposite directions. Referring to FIG. 7, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes parallel to each other, and combined by van der Waals attractive force therebetween. Length of the carbon nanotube wire can be set as desired. A diameter of the twisted carbon nanotube wire can be from about 0.5 nm to about 100 μm. Further, the twisted carbon nanotube wire can be treated with a volatile organic solvent after being twisted. After being soaked by the organic solvent, the adjacent paralleled carbon nanotubes in the twisted carbon nanotube wire will bundle together, due to the surface tension of the organic solvent when the organic solvent volatilizing. The specific surface area of the twisted carbon nanotube wire will decrease, while the density and strength of the twisted carbon nanotube wire will be increased. The deformation of the sound wave generator 102 can be avoided during working, and the distortion degree of the sound wave can be reduced.

In one embodiment, the sound wave generator 102 is a plurality of untwisted carbon nanotube wires. The plurality of untwisted carbon nanotube wires is formed by treating a single drawn carbon nanotube film via an organic solvent.

In other embodiments, the sound wave generator 102 can be or include a free-standing carbon nanotube composite structure. The carbon nanotube composite structure can be formed by depositing at least a conductive layer on the outer surface of the individual carbon nanotubes in the above-described carbon nanotube structure. The carbon nanotubes can be individually coated or partially covered with conductive material. Thereby, the carbon nanotube composite structure can inherit the properties of the carbon nanotube structure such as the large specific surface area, the high transparency, the small heat capacity per unit area. Further, the conductivity of the carbon nanotube composite structure is greater than the pure carbon nanotube structure. Thereby, the driven voltage of the sound wave generator 102 using a coated carbon nanotube composite structure will be decreased. The conductive material can be placed on the carbon nanotubes by using a method of vacuum evaporation, spattering, chemical vapor deposition (CVD), electroplating, or electroless plating.

The first electrode 104 and the second electrode 105 are made of conductive material. The shape of the first electrode 104 or the second electrode 105 is not limited and can be lamellar, rod, wire, and block among other shapes. A material of the first electrode 104 or the second electrode 105 can be metals, conductive adhesives, carbon nanotubes, and indium tin oxides among other conductive materials. The first electrode 104 and the second electrode 105 can be metal wire or conductive material layers, such as metal layers formed by a sputtering method, or conductive paste layers formed by a method of screen-printing.

In one embodiment, the first electrode 104 and the second electrode 105 are attached on the insulating layer 103. The first electrode 104 and the second electrode 105 are aligned along an extending direction of the recesses 108. The first portion 1020 and the second portion of the sound wave generator 102 are located between the first electrode 104 and the second electrode 105. The first electrode 104 and the second electrode 105 input electrical signals into the sound wave generator 102. The first electrode 104 and the second electrode 105 can be located on the sound wave generator 102 and fix the sound wave generator 102 to the substrate 101.

The first electrode 104 and the second electrode 105 can be electrically connected to two terminals of an electrical signal input device (such as a MP3 player) by a conductive wire. Thereby, electrical signals output from the electrical signal device can be input into the sound wave generator 102 through the first electrodes 104, and the second electrode 105.

Furthermore, a heat sink (not shown) can be located on the substrate 101, and the heat produced by the sound wave generator 102 can be transferred into the heat sink and the temperature of the sound wave generator 102 can be reduced.

The thermoacoustic device 100 is accommodated in the housing 110. The thermoacoustic device 100 can be installed on the back shell 114 of the housing 110 attachable by a fastener. In one embodiment, the thermoacoustic device 100 is fixed onto the back shell 114 by a binder. The housing 110 further includes a bulge structure 120 located on the back shell 114. The bulge structure 120 and the back shell 114 form integrity. Part of the thermoacoustic device 100 is attached with the bulge structure 120. Part of the thermoacoustic device 100 is suspended over the hollow structure to make heat generated by the thermoacoustic device 100 dissipate sufficiently.

The material of the bulge structure 120 can be insulating material, such as diamond, glass, ceramic, quartz, plastic or resin. The bulge structure 120 can have a good thermal insulating property, thereby preventing the bulge structure 120 from absorbing the heat generated by the sound wave generator 102.

The plurality of leading wires input electrical signals into the sound wave generator 102, and the sound wave generator 102 is driven by electrical signals and converts the electrical signals into heat energy. The heat capacity per unit area of the carbon nanotube structure is extremely small, and thus, the temperature of the carbon nanotube structure can change rapidly. Thermal waves, which are propagated into surrounding medium, are obtained. Therefore, the surrounding medium, such as ambient air, can be heated at a frequency. The thermal waves produce pressure waves in the surrounding medium, resulting in sound wave generation. In this process, it is the thermal expansion and contraction of the medium in the vicinity of the sound wave generator 102 that produces sound. The operating principle of the sound wave generator 102 is the "optical-thermal-sound" conversion.

The earphone 10 has following advantages. First, the width of the recess 108 is equal to or greater than 0.2 millimeters and smaller than or equal to 1 millimeter, thus the carbon nanotube structure can be effectively protected from being broken. Second, the depth of the recesses is greater than 100 micrometers and less than about 200 micrometers, to make the heat dissipated sufficiently and avoid interference cancellation between the original sound waves and the reflected sound waves.

Figure 8:
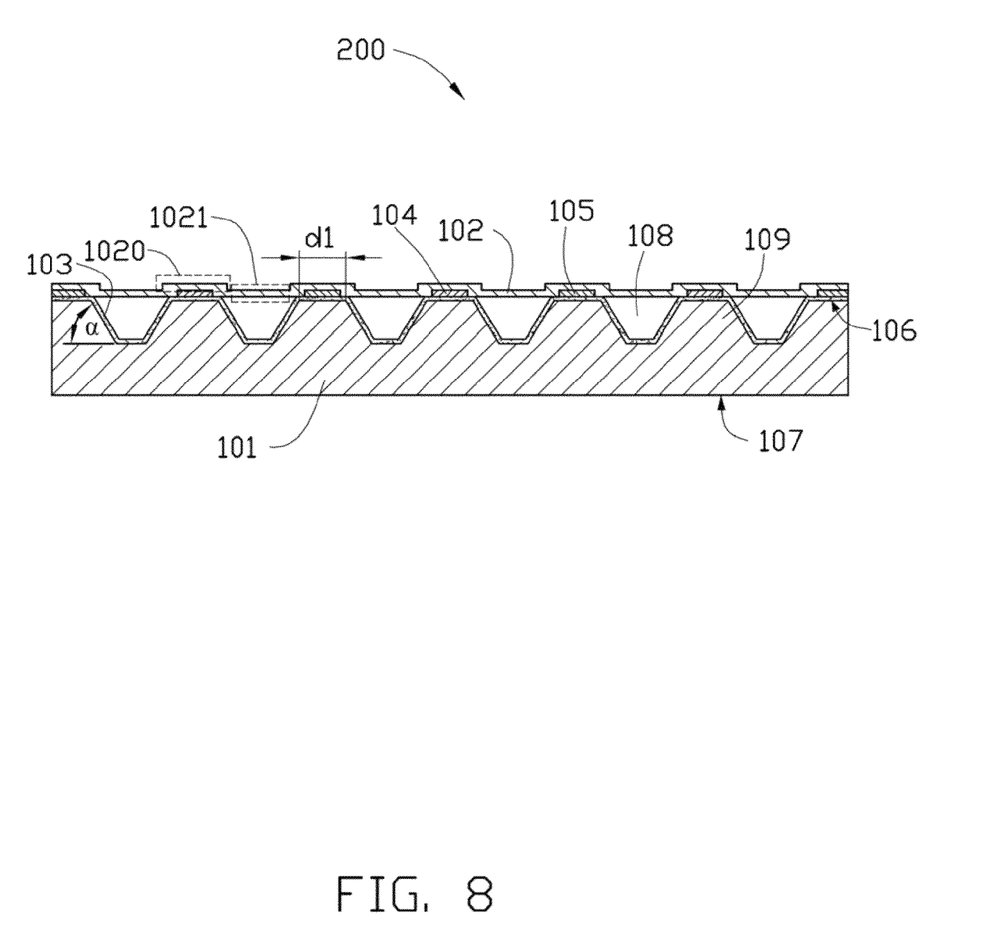
FIG. 8 is a cross-sectional view of a thermoacoustic device of an earphone in another embodiment.

FIG. 8 shows one embodiment of an earphone 20. The earphone 20 includes a housing and a thermoacoustic device 200 disposed in the housing. The housing has a hollow structure. The thermoacoustic device 200 is received in the hollow structure.

The structure of the earphone 20 is similar to that of the earphone 10, except that the thermoacoustic device 200 of the earphone 20 includes the plurality of first electrodes 104 and the plurality of second electrodes 105.

The plurality of first electrodes 104 and the plurality of second electrodes 105 can be arranged as a staggered manner of "a-b-a-b-a-b . . . ". All the plurality of first electrodes 104 is electrically connected together and all the plurality of second electrodes 105 is electrically connected together, whereby the sections of the sound wave generator 102 between the adjacent first electrode 104 and the second electrode 105 are in parallel. An electrical signal is conducted in the sound wave generator 102 from the plurality of first electrodes 104 to the plurality of second electrodes 105. By placing the sections in parallel, the resistance of the thermoacoustic device is decreased. Therefore, the driving voltage of the thermoacoustic device can be decreased with the same effect.

The plurality of first electrodes 104 and the plurality of second electrodes 105 can be substantially parallel to each other with a same distance between the adjacent first electrode 104 and the second electrode 105. The plurality of first electrodes 104 and the plurality of second electrodes 105 are alternatively located on the plurality of bulges 109. The sound wave generator 102 between adjacent first electrodes 104 and the second electrodes 105 is suspended over the plurality of recesses 108.

To connect all the plurality of first electrodes 104 together, and connect all the plurality of second electrodes 105 together, first conducting member and second conducting member can be arranged. All the plurality of first electrodes 104 are connected to the first conducting member. All the plurality of second electrodes 105 are connected to the second conducting member. The sound wave generator 102 is divided by the plurality of first electrodes 104 and the plurality of second electrodes 105 into many sections. The sections of the sound wave generator 102 between the adjacent first electrode 104 and the second electrode 105 are in parallel. An electrical signal is conducted in the sound wave generator 102 from the plurality of first electrodes 104 to the plurality of second electrodes 105.

Figure 9:
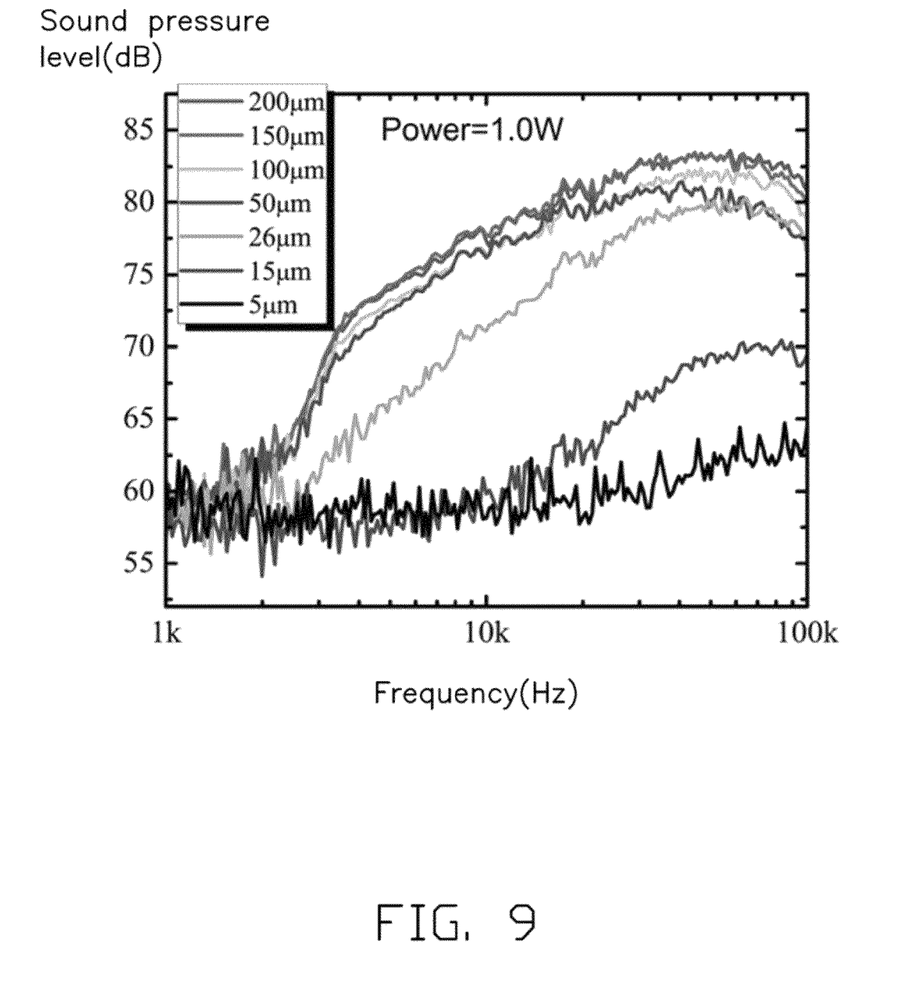
FIG. 9 shows a sound pressure level-frequency curve of the earphone of FIG. 1.
Figure 10:
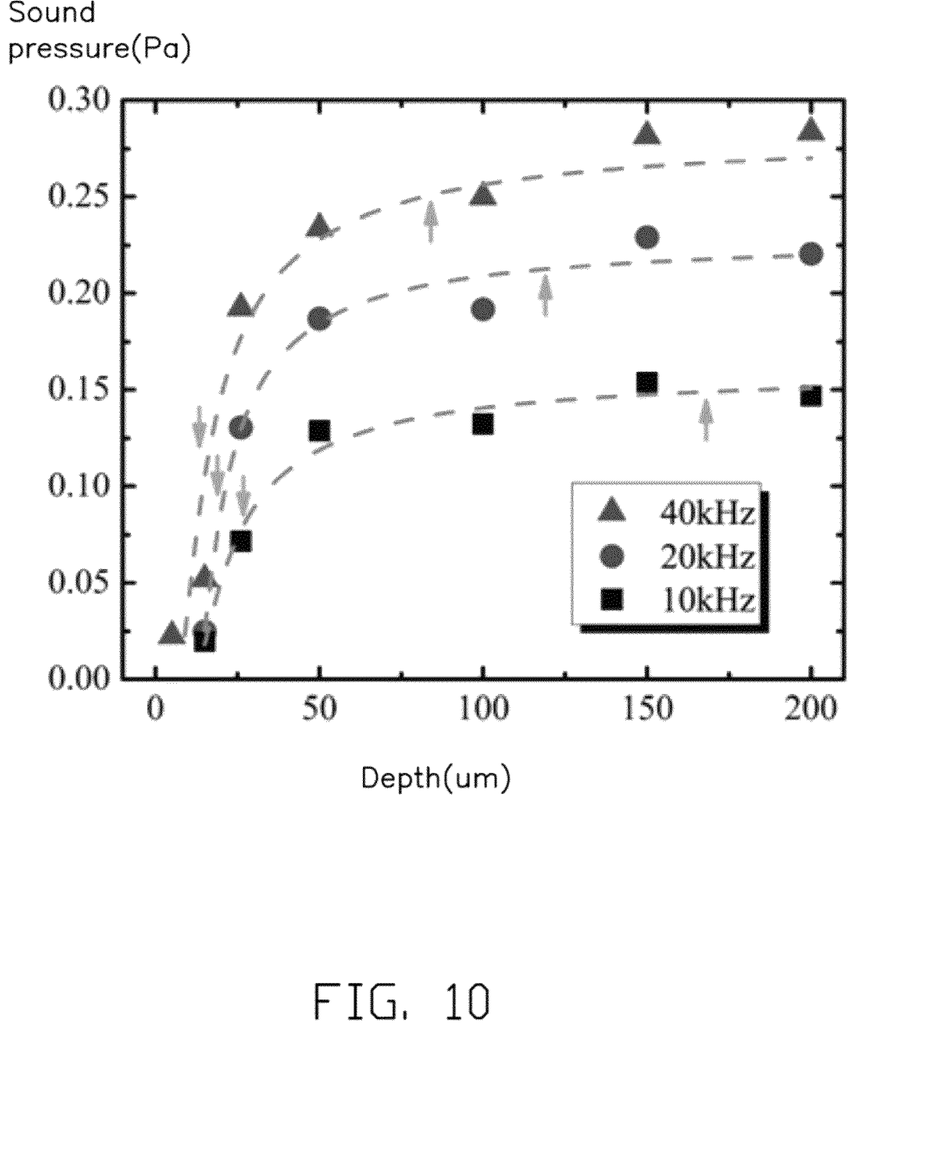
FIG. 10 shows a schematic view of acoustic effect of the earphone of FIG. 1.

Referring to FIGS. 9-10, the sound effect of the thermoacoustic device 200 is related to the depth of the plurality of recesses 108. In one embodiment, the depth of the plurality of recesses 108 ranges from about 100 micrometers to about 200 micrometers. Thus in the frequency band for which the human can hear, the thermoacoustic device 200 has excellent thermal wavelength. Therefore, the thermoacoustic device 200 of the earphone 20 still has a good sound effect even for its small size.

Figure 11:
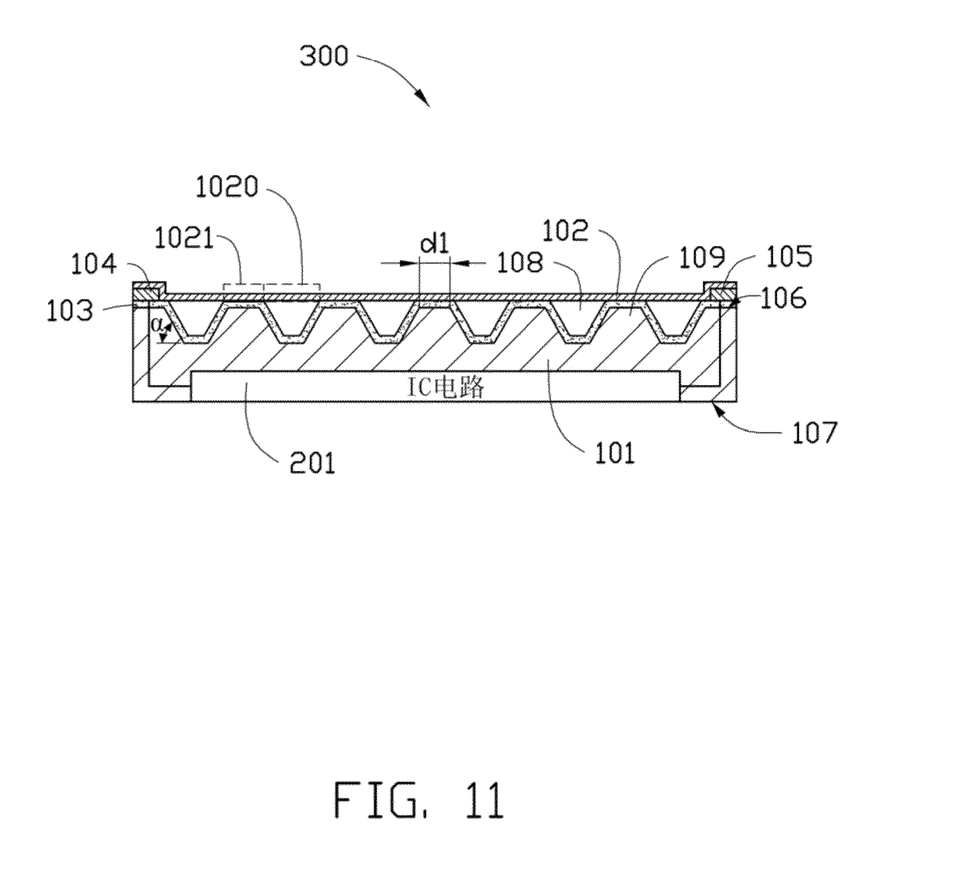
FIG. 11 is a cross-sectional view of a thermoacoustic device of an earphone in another embodiment.

FIG. 11 shows one embodiment of an earphone 30. The earphone 30 includes a housing and a thermoacoustic device 300 disposed in the housing. The housing has a hollow structure. The thermoacoustic device 300 is received in the hollow structure.

The structure of the earphone 30 is similar to that of the earphone 10, except that the substrate 101 further defines a cavity on the second surface 107, and an integrated circuit chip 201 is received into the cavity.

The material of the substrate 101 can be silicon, thus the integrated circuit chip 201 can be directly integrated onto the substrate 101. In one embodiment, the thermoacoustic device 300 further includes a third electrode and a fourth electrode. The third electrode and the fourth electrode are used to apply audio signal from the integrated circuit chip 201 into the sound wave generator 102. The third electrode and the fourth electrode are insulated from the substrate 101. The third electrode can be electrically connected to the first electrode 104 and the integrated circuit chip 201, and the fourth electrode can be electrically connected to the second electrode 105 and the integrated circuit chip 201.

Furthermore, the integrated circuit chip 201 can also be located on the first surface 106, thus the third electrode and the fourth electrode can be avoided. The material of the substrate 101 is silicon, thus the integrated circuit chip 201 can be directly integrated into the substrate 101, and the size of the thermoacoustic device 300 can be reduced. Furthermore, the substrate 101 has better thermal conductivity, thus the heat can be effectively conducted out of the thermoacoustic device 300, and distortion of the sound wave can be reduced.

Figure 12:
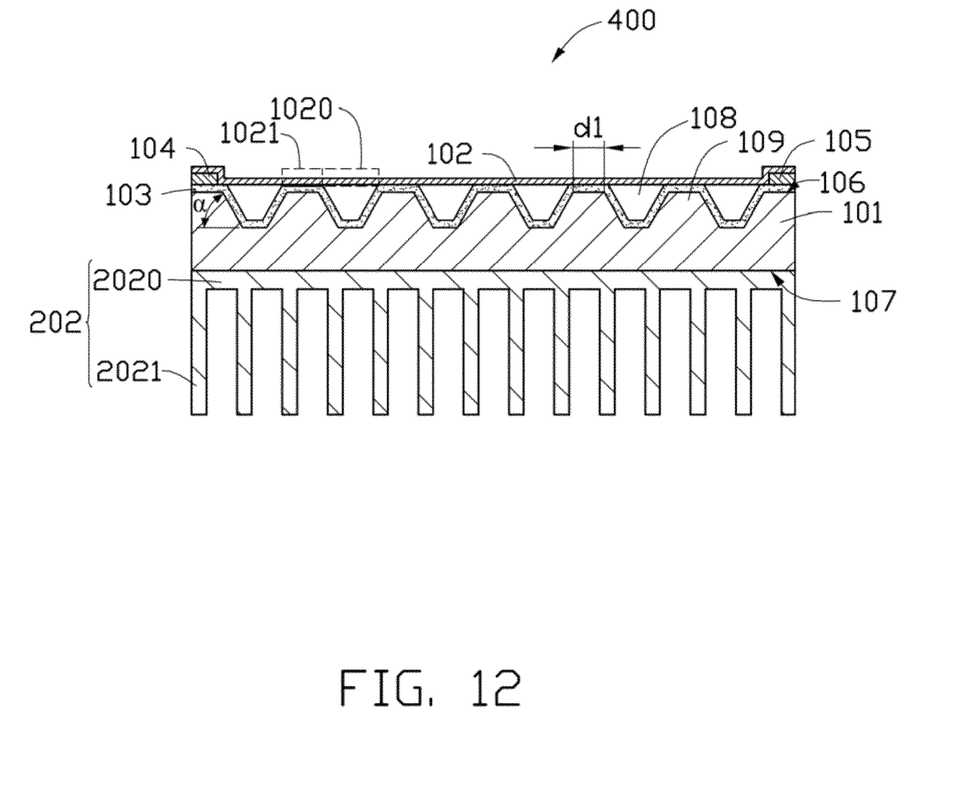
FIG. 12 is a cross-sectional view of a thermoacoustic device of an earphone in another embodiment.

FIG. 12 shows one embodiment of an earphone 40. The earphone 40 includes a housing and a thermoacoustic device 400 disposed in the housing. The housing has a hollow structure. The thermoacoustic device 400 is received in the hollow structure.

The structure of the earphone 40 is similar to that of the earphone 10, except that the thermoacoustic device 400 further includes a heat-sink element 202 on the second surface 107.

The heat-sink element 202 is fixed on the second surface 107 by a binder or other carrier element. The heat-sink element 202 includes a base 2020 and a plurality of fins 2021 located on a surface of the base 2020. The base 2020 is sheet-shaped. The plurality of fins 2021 is fixed on the surface of the base 2020 by a binder, a bolt, or a welded joint. The material of the plurality of fins 2021 is metal, such as gold, silver, copper, iron, aluminum or a combination thereof. In one embodiment, the plurality of fins 2021 is copper sheet with a thickness in a range of about 0.5 millimeters to 1 millimeter. The heat-sink element 202 makes the heat dissipated sufficiently.

The earphone 40 further comprises a plurality of heat-sink holes located on the back shell 114.

It is to be understood that the above-described embodiments are intended to illustrate rather than limit the invention. Variations may be made to the embodiments without departing from the spirit of the invention as claimed. Any elements discussed with any embodiment are envisioned to be able to be used with the other embodiments. The above-described embodiments illustrate the scope of the invention but do not restrict the scope of the invention.

What is claimed is:

1. An earphone, the earphone comprising:
a housing having a hollow structure;
a thermoacoustic device disposed in the housing, wherein the thermoacoustic device comprising:
a substrate having a first surface and a second surface, opposite to the first surface;
a sound wave generator located on the first surface of the substrate; and
a first electrode and a second electrode spaced from each other and electrically connected to the sound wave generator;
wherein the substrate comprises silicon, and the first surface defines a plurality of recesses parallel with and spaced from each other, a depth of each of the plurality of recesses ranges from about 100 micrometers to about 200 micrometers, and the sound wave generator comprises a carbon nanotube structure that is suspended over the plurality of recesses.

2. The earphone of claim 1, wherein the housing defines a plurality of through openings, and the thermoacoustic device is spaced with and opposite to the plurality of through openings.

3. The earphone of claim 1, wherein the thermoacoustic device is installed in the housing by a fastener.

4. The earphone of claim 1, further comprising a plurality of leading wires electrically connected to the thermoacoustic device.

5. The earphone of claim 1, wherein a width of each of the plurality of recesses ranges from about 0.2 millimeters to about 1 millimeter.

6. The earphone of claim 1, further comprising an insulating layer located on the first surface between adjacent two recesses.

7. The earphone of claim 1, wherein further comprising an insulating layer covering the entire first surface.

8. The earphone of claim 1, wherein the carbon nanotube structure comprises a plurality of carbon nanotubes substantially oriented along a first direction and parallel with the first surface of the substrate.

9. The earphone of claim 8, wherein the plurality of recesses extends along a second direction, an angle is formed by the first direction and the second direction, and the angle is larger than 0 degrees and smaller than or equal to 90 degrees.

10. The earphone of claim 8, wherein the carbon nanotube structure comprises a carbon nanotube film, and the carbon nanotube film comprises the plurality of carbon nanotubes substantially extending along the same direction.

11. The earphone of claim 8, wherein the carbon nanotube structure comprises a plurality of carbon nanotube wires extending along the same direction, and each of the plurality of carbon nanotube wires is parallel with and spaced from each other.

12. The earphone of claim 11, wherein the plurality of carbon nanotube wires intersects with the plurality of recesses.

13. The earphone of claim 11, wherein each of the plurality of carbon nanotube wires comprises the plurality of carbon nanotubes parallel with each other.

14. The earphone of claim 11, wherein each of the plurality of carbon nanotube wires comprises the plurality of carbon nanotubes helically oriented around an axial of the carbon nanotube wires.

15. The earphone of claim 11, wherein a distance between adjacent two carbon nanotube wires ranges from about 0.1 micrometers to about 200 micrometers.

16. The earphone of claim 1, further comprising a plurality of bulges, a plurality of third electrodes, and a plurality of fourth electrodes, and each bulge is located between adjacent two grooves, the plurality of third electrodes and the plurality of fourth electrodes are alternatively located on the plurality of bulges.

17. The earphone of claim 1, further comprising an integrated circuit chip on the second surface of the substrate, and the integrated circuit chip is integrated into the substrate and configured to apply audio signal into the sound wave generator.

18. The earphone of claim 17, wherein the integrated circuit chip is electrically connected to the first electrode and the second electrode.

19. The earphone of claim 1, wherein further comprising a heat-sink element on the second surface of the substrate.

20. An earphone, the earphone comprising:
a housing having a hollow structure;
a thermoacoustic device disposed in the housing, wherein the thermoacoustic device comprising:
  a substrate having a surface, wherein the substrate defines a plurality of recesses on the surface of the substrate, and the plurality of recesses is spaced from and parallel with each other;
  a sound wave generator located on the surface of the substrate, wherein the sound wave generator comprises a carbon nanotube structure that is suspended over the plurality of recesses; and
  a first electrode and a second electrode spaced from each other and electrically connected to the sound wave generator, wherein at least one of the plurality of recesses is located between the first electrode and the second electrode.

* * * * *